United States Patent [19]

Renner et al.

[11] 4,374,579
[45] Feb. 22, 1983

[54] SPACECRAFT CONFIGURATION PERMITTING A CONTINUOUS THREE-AXES ATTITUDE CONTROL

[75] Inventors: Udo Renner, Leiden; A. Werner Preukschat, Noordwijk, both of Netherlands

[73] Assignee: European Space Agency, France

[21] Appl. No.: 217,165

[22] Filed: Dec. 16, 1980

[30] Foreign Application Priority Data

Dec. 27, 1979 [FR] France .................. 79 31779

[51] Int. Cl.³ .................................. B64G 1/10
[52] U.S. Cl. ............................ 244/158 R; 244/164; 244/171; 244/173
[58] Field of Search .............. 244/158, 159, 164, 167, 244/168, 169, 171, 173

[56] References Cited

U.S. PATENT DOCUMENTS 3,781,647 12/1973 Glaser .................. 244/159

OTHER PUBLICATIONS

Harry Press, "Intro. to the Nimbus Meteorological Satellite Program", IEEE Transactions on Geoscience Electronics vol. GE 8, Oct. 1970.

Bernard Raab, "Unique Features of Dynamic Isotope Power Systems . . . ", 15th Inter-Society Energy Conversion Conference, Aug. 18-22 1980, pp. 1023.

Glen Fountain et al., "The Magsat Attitude Determination System", Johns Hopkins APL Digest, vol. 1, No. 3, pp. 194-200, Jul.-Sep. 1980.

Primary Examiner—Charles E. Frankfort
Attorney, Agent, or Firm—Hill, Van Santen, Steadman, Chiara & Simpson

[57] ABSTRACT

A spacecraft configuration including a service module which carries optical stabilizing equipment for stabilizing the spacecraft relative to two inertially fixed targets together with solar arrays rigidly attached thereto so as to extend in the orbital plane and never obstruct the field of view of the optical stabilization equipment. The payload module is attached to one face of the service module by means of rotary interface structure to be able to continuously point to the earth.

2 Claims, 2 Drawing Figures

SPACECRAFT CONFIGURATION PERMITTING A CONTINUOUS THREE-AXES ATTITUDE CONTROL

BACKGROUND OF THE INVENTION

The present invention relates to a new satellite configuration which permits a three-axes attitude control of the satellite with continuous pointing of one axis to the earth for payload operation.

To date the usual spacecraft configuration comprises a payload and service module pointing to the earth and solar arrays mounted on the north and south faces of the spacecraft such as to be capable of being rotated while remaining perpendicular to the sun direction. This known configuration is illustrated in FIG. 1 which schematically depicts an exemplary satellite 10. The payload and service module is designated by numeral 11 and the solar arrays are designated by numeral 12. The solar arrays 12 are mounted so as to be capable of being rotated about their longitudinal axis in the direction of the arrows 13 while remaining perpendicular to the sun direction. The module 11 is equipped with an earth sensor 14 which provides two-axes attitude information in pitch and roll. The missing yaw information requires the use of a momentum wheel having its momentum vector perpendicular to the orbital plane.

The known configuration has the following typical disadvantages:

(1) The earth horizon is a target with limited accuracy. Now some missions may demand pointing accuracies beyond the capability of infrared horizon sensors. Using RF earth sensors is a complex alternative which needs further development. In addition, whatever earth sensor may be disturbed by irregularities and by the sun and the moon as well.

(2) The presence of solar panels on the north and south faces of the satellite results in several disadvantageous consequences. First, the thrust for the correction of the north/south direction on a OTS satellite for instance requires two thrusters to be installed, for one sole thruster cannot fire through the center of gravity of the satellite. Second, said pair of thrusters may produce significant disturbing torques. Third, the north and south faces are obstructed and consequently their surfaces badly work as heat radiation areas.

(3) In transfer orbit operation there is required a special 3-axes stabilization equipment of the same type as that required for geostationary orbit.

(4) In case of a temporary breakdown of the attitude control system, the spacecraft is prone to flat spin.

SUMMARY OF THE INVENTION

The object of this invention is a new spacecraft configuration which provides continuous 3-axes attitude control information with higher accuracy than the known configuration and which avoids the above mentioned disadvantages of the known configuration.

Another object of this invention is a new spacecraft configuration which has a reduced complexity as compared to the known configuration.

In accordance with the invention, the spacecraft configuration comprises a service module having first sensor means arranged to point to a first intertially fixed target and second sensor means arranged to point to a second inertially fixed target, said first and second sensor means providing 3-axes attitude control information for stabilization of the spacecraft; solar arrays rigidly attached to the service module such that when they are deployed in orbital configuration, they leave the field of view of said first and second sensor means unobstructed; rotary interface means or structure having first attachment means on one face for attachment to a first face of the service module and having second attachment means on its opposite face; and a payload module attached to said second attachment means on the rotary interface means, said rotary interface means being arranged to permit said payload module to continuously point to the earth.

DESCRIPTION OF AN EXEMPLARY EMBODIMENT

Figure 1:
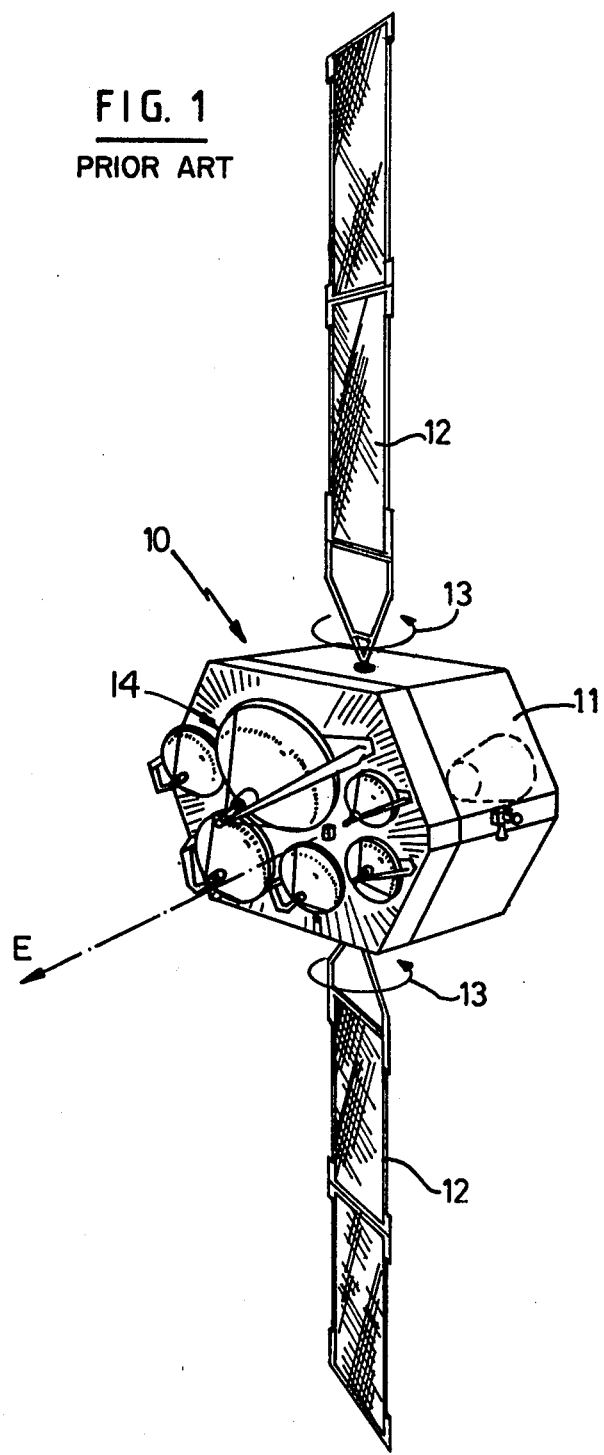
FIG. 1 depicts the known spacecraft configuration.
Figure 2:
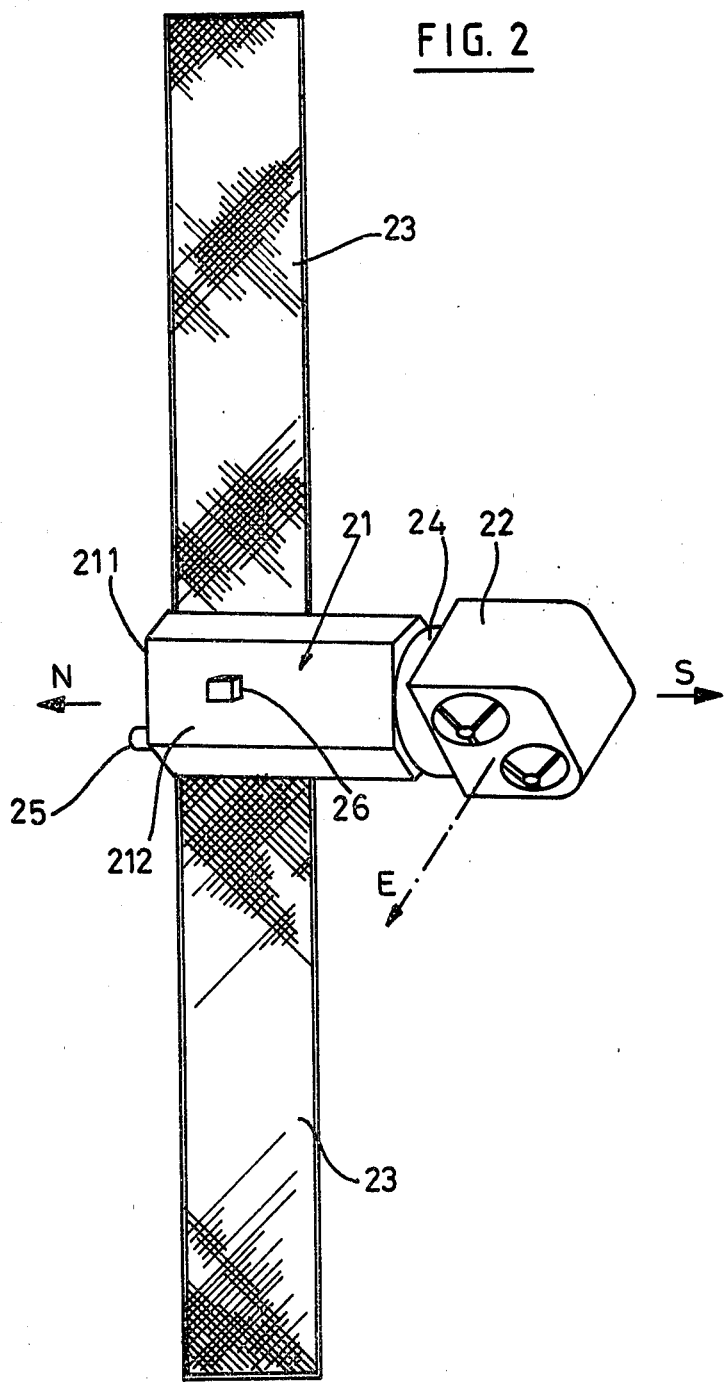
FIG. 2 schematically depict an exemplary spacecraft implemented according to the invention.

Referring to FIG. 2 there is depicted an examplary spacecraft implemented according to the configuration of the invention. Numeral 21 denotes a service module, numeral 22 denotes a payload module and numeral 23 denotes a pair of solar arrays which are rigidly attached to two faces of the service module 21. The arrows labelled N and S indicate the north and south directions respectively. The payload module 22 is attached to the south face of the service module 21 by means of rotary interface means 24 consisting of a bearing assembly (with or without motors) with passage means for the power energy connections and the transfer of the control data. The rotary interface means 24 are arranged such that the payload module 22, as usual, is continuously pointing to the earth as symbolically indicated by the arrow labelled E. The pointing of the payload module 22 to the earth is performed under control of attitude control signals from the service module 21, as is well known in the art.

The service module 21 has its north face 211 equipped with star sensor means 25 and it has one lateral face 212 equipped with sun sensor means 26. The star sensor and the sun sensor means are devices well known in the art which do not need to be described in detail herebelow. It is enough to mention in the present disclosure that the star sensor 25 provides 2-axes attitude information with respect to an inertial reference in order to keep the pitch axis of the spacecraft perpendicular to the orbital plane. The sun sensor 26 provides a single axis attitude information to keep the face 212 of the service module 21 always pointed to the sun and consequently the solar arrays 23 inertially stabilised with reference to the sun.

It is a characteristic feature of the configuration of the invention that the solar arrays are arranged such that, when deployed in orbital configuration, they never obstruct the field of view of the star sensor means 25.

The configuration of the invention as described above permits a three-axes attitude control with respect to two inertially fixed reference targets (the sun and the polaris star for instance), which provides a greater attitude control accuracy than with earth sensor, for the sun and star references are by far more accurate targets than the earth. Furthermore, the three-axes attitude control thereby provided is based on a continuous three-axes attitude control information.

The spacecraft configuration of the invention has several advantages. The major advantage, as already mentioned earlier herein, is that the pointing accuracy can be significantly increased due to the use of better reference targets and to the provision of continuous 3-axes attitude control. Other advantages are significant from the viewpoints of the reaction control, the utilisable surface area of the spacecraft and the stabilization in case of temporary breakdown of the attitude control system.

With respect to the reaction control, it will be pointed out that one thruster only needs to be used for correction in the north/south direction or the east/west direction, which results in reaction torques being avoided. This is a significant advantage when electric thrusters are used.

With regard to the utilisable surface area of the spacecraft, it will be pointed out that all the faces which do not bear solar arrays are utilisable as radiating surfaces for heat control or as large surfaces to serve other purposes, e.g. the observation of the sky. Also, only the sun facing area of the spacecraft needs to be covered with solar cells for transfer orbit power supply. Further, deployment of the solar arrays is more easier than in the known configuration.

With regard to the stabilization of the spacecraft, it will be pointed out that in case of temporary breakdown of the attitude control system there is no tendency to go to flat spin, and consequently the solar arrays are always pointing to the sun.

In order that attitude control be maintained during eclipses where the sun is not useable as a target and consequently 2-axes attitude information only is available, a momentum wheel can advantageously be provided with its angular momentum vector in the orbital plane, that is in a direction perpendicular to the pitch axis. The momentum wheel then will provide attitude control information with respect to a third axis in order to assure a three-axes stabilization.

What is claimed is:

1. A spacecraft configuration comprising a service module, said service module having first sensor means arranged to point to a first inertially fixed target and second sensor means arranged to point to a second inertially fixed target, said first and second sensor means providing 3-axes attitude control information for stabilization of the spacecraft; solar arrays rigidly attached to the service module such that when they are deployed in orbital configuration, they leave the field of view of said first and second sensor means unobstructed; rotary interface means having first attachment means on one face for attachment to a first face of the service module and having second attachment means on its opposite face; and a payload module attached to said second attachment means on the rotary interface means; said rotary interface means being arranged to permit said payload module to continuously point to the earth.

2. A spacecraft configuration according to claim 1, wherein said first sensor means is a star sensor disposed on the face of the service module which is opposed to said first face thereof, and wherein said second sensor means is a solar sensor disposed on a face of the service module which extends perpendicularly to said first face, said star and sun sensor means providing 3-axes attitude control information.

* * * * *